(12) United States Patent
Ho et al.

(10) Patent No.: US 7,420,770 B2
(45) Date of Patent: Sep. 2, 2008

(54) MAGNETIC DISK DRIVE APPARATUS HAVING FIRST AND SECOND CONNECTION SECTIONS ELECTRONICALLY CONDUCTED BY PRESSURE CONTACT

(75) Inventors: Yiu Sing Ho, Kwai Chung (HK); Takehiro Kamigama, Kwai Chung (HK); Masashi Shiraishi, Kwai Chung (HK)

(73) Assignee: SAE Magnetics (H.K.) Ltd., Kwai Chung, N.T. (HK)

( * ) Notice: Subject to any disclaimer, the term of this patent is extended or adjusted under 35 U.S.C. 154(b) by 256 days.

(21) Appl. No.: 10/987,154

(22) Filed: Nov. 15, 2004

(65) Prior Publication Data

US 2005/0111135 A1 May 26, 2005

(30) Foreign Application Priority Data

Nov. 20, 2003 (JP) ............................. 2003-390562

(51) Int. Cl.
*G11B 5/012* (2006.01)
(52) U.S. Cl. ................................. 360/97.01
(58) Field of Classification Search ........................ None
See application file for complete search history.

(56) References Cited

U.S. PATENT DOCUMENTS 5,282,099 A * 1/1994 Kawagoe et al. ......... 360/97.01
5,880,904 A * 3/1999 Mizoshita et al. ........ 360/97.01
6,057,982 A * 5/2000 Kloeppel .................. 360/97.01
6,347,023 B1 * 2/2002 Suwa ....................... 360/264.8
6,900,961 B1 * 5/2005 Butler ...................... 360/97.01

FOREIGN PATENT DOCUMENTS

JP 6-215513 8/1994

* cited by examiner

*Primary Examiner*—David D Davis
(74) *Attorney, Agent, or Firm*—Oblon, Spivak, McClelland, Maier & Neustadt, P.C.

(57) ABSTRACT

A magnetic disk drive apparatus includes a housing member with at least one opened face, a cover member for covering the at least one opened face of the housing member, a head gimbal assembly including a magnetic head slider and a suspension for supporting the magnetic head slider, a support arm for supporting the head gimbal assembly, a magnetic disk to which the magnetic head slider opposed, a motor for rotating the magnetic disk, a first wiring member with one end electrically connected to the motor and the other end electrically connected to a first connection section, and a second wiring member with one end electrically connected to a second connection section and the other end electrically connected to an external connection connector. The magnetic disk, the motor, the first connection section and the first wiring member are attached to the housing member, and the support arm, the second connection section and the second wiring member are fixed to the cover member. The first connection section and the second connection section are electrically conducted by pressure contact.

10 Claims, 6 Drawing Sheets

MAGNETIC DISK DRIVE APPARATUS HAVING FIRST AND SECOND CONNECTION SECTIONS ELECTRONICALLY CONDUCTED BY PRESSURE CONTACT

PRIORITY CLAIM

This application claims priority from Japanese patent application No. 2003-390562, filed on Nov. 20, 2003, which is incorporated herein by reference.

BACKGROUND OF THE INVENTION

1. Field of the Invention

The present invention relates to a magnetic disk drive apparatus.

2. Description of the Related Art

In a magnetic disk drive apparatus or a hard disk drive (HDD) apparatus, a thin-film magnetic head element for writing magnetic information into and/or reading magnetic information from a magnetic disk or a hard disk is in general formed on a magnetic head slider flying in operation above the rotating magnetic disk. The slider is supported at top end section of a suspension of a head gimbal assembly (HGA).

The HDD apparatus has in general a housing member with an opened top face and a cover member for covering the top face to accommodate inside at least one magnetic disk, a drive motor for rotating the disk, at least one HGA with a magnetic head slider, a suspension and a wiring member, a support arm for supporting the at least one HGA, and an actuator such as a voice coil motor (VCM) for swinging the support arm in a plane parallel to the magnetic disk.

In the conventional HDD apparatus, as disclosed in Japanese patent publication No. 06-215513 A2, these main components such as the magnetic disk, the drive motor, the HGA, the support arm and the VCM are attached to the housing member, but are not attached to the cover member. The cover member is used only for covering the opening of the housing member to seal the HDD apparatus.

In such the conventional HDD apparatus, both the magnetic disk with a recording surface that should be kept free of contamination and the HGA are attached to the housing member side. Therefore, when the HGA has to be replaced due to malfunctions after assembling in the HDD apparatus, it is necessary to pay close attention to prevention of the contamination of the magnetic disk surface.

In the conventional manufacturing process of the HDD apparatus, in general, first the magnetic head slider is attached to the suspension to form an HGA that has a proper size for a worker to easily handle, and then the HGA is assembled in the HDD apparatus by the worker. Thus, a thin-film magnetic head element formed on the slider is sometimes destroyed by electrostatic discharge (ESD). Thus, in case that the thin-film magnetic head element of the slider is a magnetoresistive effect (MR) element, particularly, a giant magnetoresistive effect (GMR) element or a tunneling magnetoresistive effect (TMR) element, it must give special consideration to the prevention of possible ESD destruction.

In order to solve the aforementioned problems in the conventional HDD apparatus, the applicants have already proposed an HDD apparatus having a housing member, a cover member fixed to the housing member for covering its opened face, an HGA including a magnetic head slider and a suspension for supporting the magnetic head slider, a support arm for supporting the HGA, a magnetic disk and a motor for rotating the magnetic disk, wherein the magnetic disk and the motor are attached to the housing member and the support arm is attached to the cover member. This proposed HDD apparatus is not known in public at filing of this application.

In case that the magnetic disk and the motor are mounted on the housing member and main components except for these are mounted on the cover member, because wiring to the motor that is attached to the housing member and wirings to the VCM and the magnetic head slider that are attached to the cover member are connected to a single connector for external connection via flexible print circuits (FPCs), it is impossible to completely separate the housing member and the cover member.

Thus, it is very difficult to replace only the HGA without inducing contamination of the magnetic disk surface after assembling the HGA into the HDD apparatus.

BRIEF SUMMARY OF THE INVENTION

It is therefore an object of the present invention to provide a magnetic disk drive apparatus, whereby in case that the magnetic disk and the motor are mounted on the housing member and main components except for these are mounted on the cover member, electrical wiring can be easily connected and disconnected.

According to the present invention, a magnetic disk drive apparatus includes a housing member with at least one opened face, a cover member for covering the at least one opened face of the housing member, a head gimbal assembly including a magnetic head slider and a suspension for supporting the magnetic head slider, a support arm for supporting the head gimbal assembly, a magnetic disk to which the magnetic head slider opposed, a motor for rotating the magnetic disk, a first wiring member with one end electrically connected to the motor and the other end electrically connected to a first connection section, and a second wiring member with one end electrically connected to a second connection section and the other end electrically connected to an external connection connector. The magnetic disk, the motor, the first connection section and the first wiring member are attached to the housing member, and the support arm, the second connection section and the second wiring member are fixed to the cover member. The first connection section and the second connection section are electrically conducted by pressure contact.

Because the support arm with the HGA having the magnetic head slider and the suspension are attached to the cover member, whereas the magnetic disk and the motor are attached to the housing member, it is possible to assemble the HGA in isolation from the housing member provided with the magnetic disk of which surface has to keep clean. Thus, flexibility of tools or devices used for assembling the HGA can be increased and also assembling itself can be performed with a high degree of efficiency. Particularly, according to the present invention, because the first connection section of the housing member side and the second connection section of the cover member side are electrically conducted by pressure contact, when attaching and detaching the cover member to and from the housing member, electrical wiring can be easily connected and disconnected.

Furthermore, when replacing the HGA already assembled in the HDD apparatus, the replacement work can be performed by detaching only the cover member from the HDD apparatus, namely by treating only the cover member in isolation from the housing member, no contamination of the disk surface can be induced and also the replacement can be effectively executed.

It is preferred that the first connection section and the second connection section are electrically conducted with each other by pressure contact using conductive material projections. In this case, preferably, the conductive material projections are formed on the first connection section and/or the second connection section. Also, it is preferred that the conductive material projections are gold-coated metal projections.

It is preferred that the first connection section and the second connection section are electrically conducted with each other by pressure contact using conductive material balls. In this case, preferably, the conductive material balls are formed on the first connection section and/or the second connection section. Also, it is preferred that the conductive material balls are gold balls.

It is also preferred that the apparatus further includes an actuator for rotatively moving the support arm in parallel with a surface of the magnetic disk. A part of the actuator is attached to the cover member. In this case, preferably, the remaining part of the actuator is attached to the housing member.

It is preferred that the apparatus further includes a ramp preliminarily attached to the cover member, on which the support arm sits when the apparatus is out of operation.

Further objects and advantages of the present invention will be apparent from the following description of the preferred embodiments of the invention as illustrated in the accompanying drawings.

DETAILED DESCRIPTION OF THE INVENTION

Figure 1:
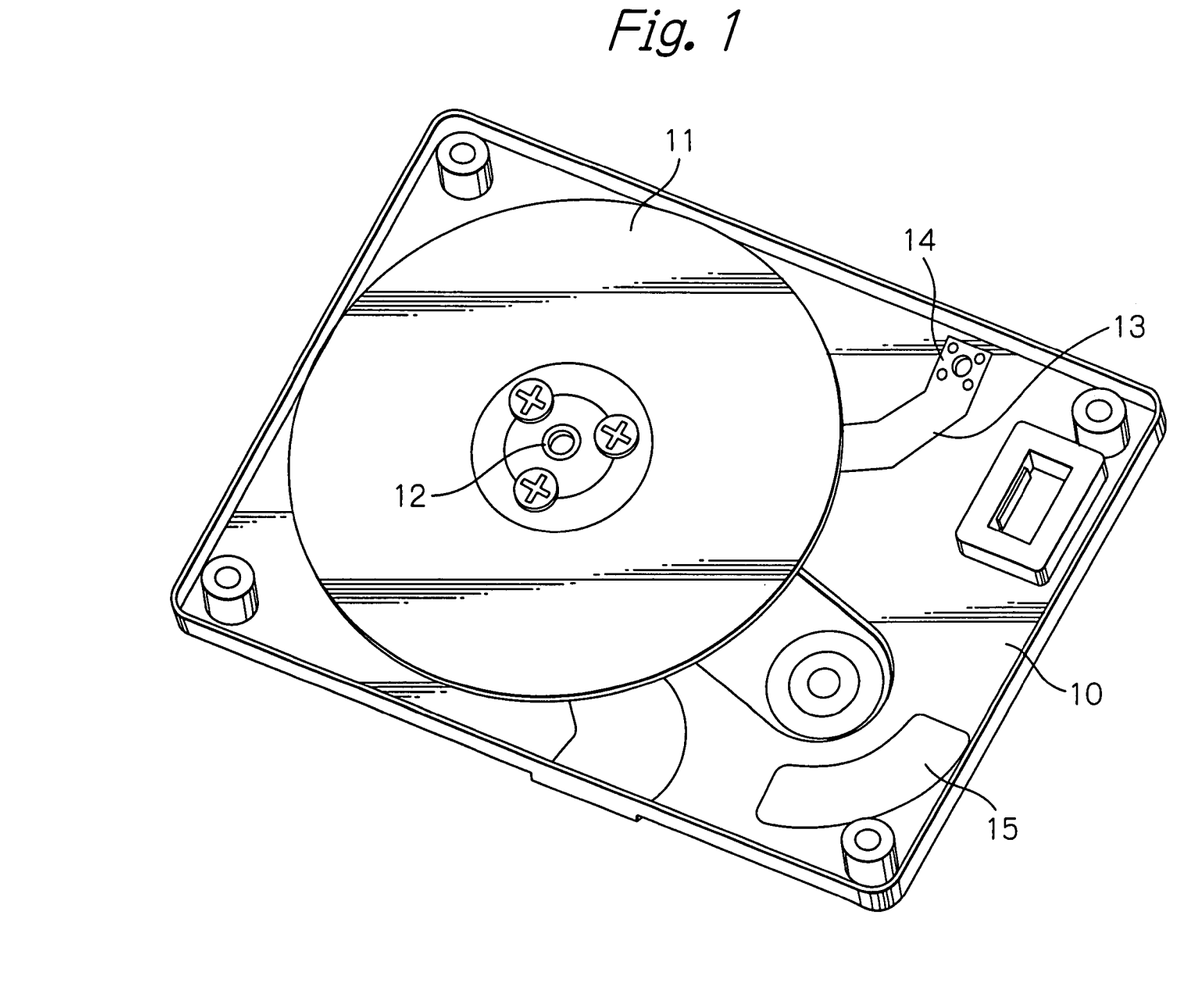
FIG. 1 shows an oblique view schematically illustrating configuration of a housing member side of an HDD apparatus as a preferred embodiment according to the present invention.
Figure 2:
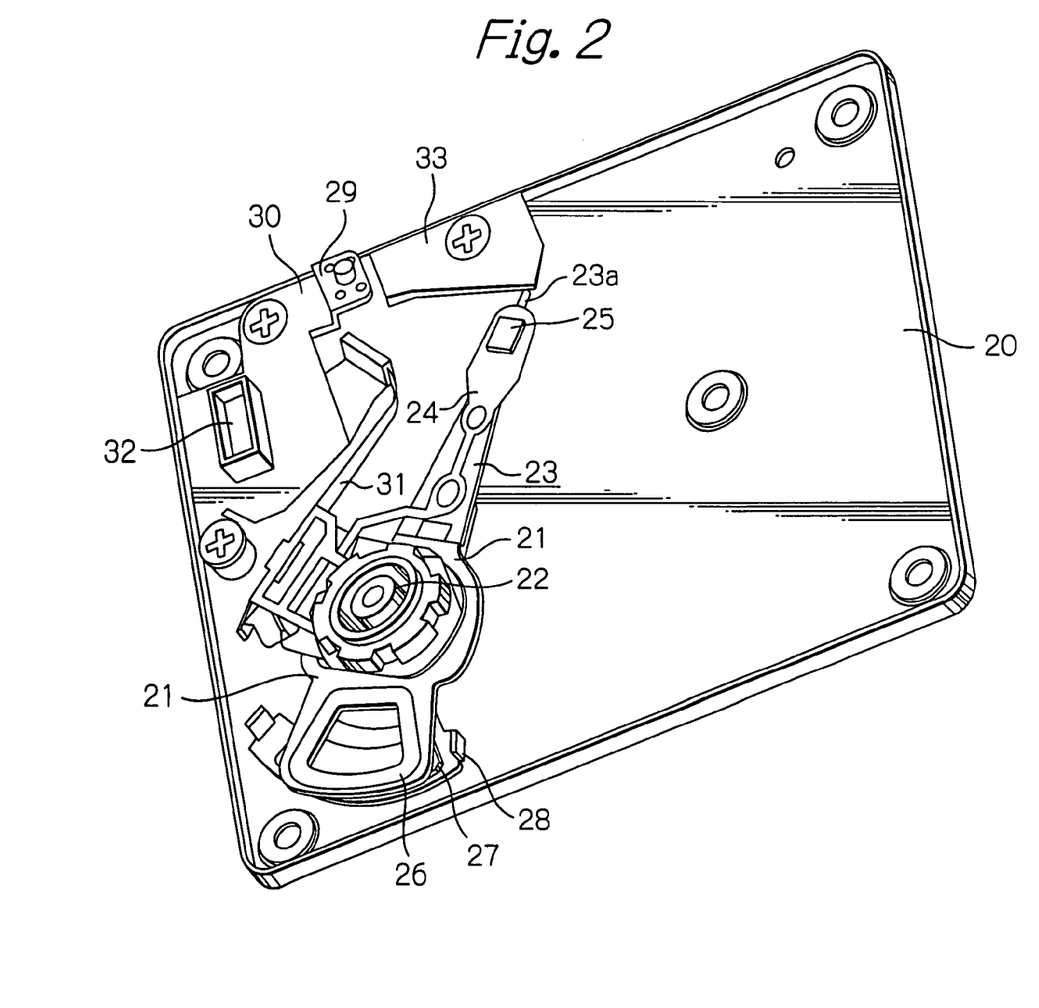
FIG. 2 shows an oblique view schematically illustrating configuration of a cover member side of the HDD apparatus in the embodiment.

FIG. 1 schematically illustrates the configuration of a housing member side of an HDD apparatus as a preferred embodiment according to the present invention, and FIG. 2 schematically illustrates the configuration of a cover member side of this HDD apparatus.

In FIG. 1, reference numeral 10 denotes a housing member with one face opened, 11 denotes a single magnetic disk rotatably mounted on the housing member 10, 12 denotes an axis of a spindle motor (not shown) attached to the housing member 10 for rotating the magnetic disk 11, 13 denotes a first wiring member with one end electrically connected to the spindle motor for supplying power thereto, which is made of an FPC formed by a base resin layer, conductors laminated on the base resin layer and a coating resin layer for example, 14 denotes a first connection section electrically connected to the other end of the first wiring member 13, and 15 denotes a part of a yoke section of a VCM, which is attached to the housing member 10, respectively.

In FIG. 2, reference numeral 20 denotes a cover member for covering and closing the opened face of the housing member 10, and 21 denotes a support arm made of an extremely high stiffness member and attached to a horizontal rotation axis 22 that is fixed to the cover member 20. The support arm 21 can rotate in a plane parallel to the magnetic disk 11. In FIG. 2, also, reference numeral 23 denotes a load beam made of a high stiffness member or configured to have high stiffness. This load beam 23 is fixed to the support arm 21 at the top end side with respect to the horizontal rotation axis 22.

In FIG. 2, further, reference numeral 23a denotes a lift tab formed at the top end of the load beam 23, for keeping the HGA separated from the magnetic disk surface when the magnetic head is out of operation, 24 denotes a resilient flexure fixed to the load beam 23, 25 denotes a magnetic head slider mounted on the flexure 24 and provided with a thin-film magnetic head element consisting of a write head element and an MR read head element such as a GMR head element or a TMR head element, 26 denotes a coil section of the VCM, attached to the support arm 21 at the rear end side with respect to the horizontal rotation axis 22 for rotating this support arm 21, 27 denotes a magnet section of the VCM, fixed to the cover member 20, 28 denotes the remaining part of the yoke section of the VCM, fixed to the cover member 20, 29 denotes a second connection section electrically and detachably connected to the first connection section 14 that is attached to the housing member 10, 30 denotes a second wiring member with one end electrically connected to the second connection section 29, which is made of an FPC formed by a base resin layer, conductors laminated on the base resin layer and a coating resin layer for example, 31 denotes a third wiring member with one end electrically connected to the thin-film magnetic head element and the coil section 26 of the VCM for supplying a signal and sense current to the thin-film magnetic head element, for retrieving a signal from the thin-film magnetic head element and for supplying drive current to the coil section 26 of the VCM, 32 denotes an external connection connector electrically connected to the other ends of the second and third wiring members and provided with a head amplifier for amplifying the signal from the thin-film magnetic head element, and 33 denotes a ramp attached to the cover member 20, on which the lift tab of 23a of the suspension sits when the magnetic head is out of operation, respectively. The third wiring member 31 consists of for example an FPC formed by a base resin layer, conductors laminated on the base resin layer and a coating resin layer, and has an IC chip.

The flexure 24 in this embodiment is made of a resilient metal plate and has a flexible tongue (not shown) at its top end section. This tongue flexibly supports the magnetic head slider 25 to provide stability in the flying attitude of the slider. On the flexure 24, a plurality of trace conductors (not shown) for passing sense current and write current to the thin-film magnetic head and signals from the thin-film magnetic head are formed. One ends of these trace conductors are electrically connected to the thin-film magnetic head element and the other ends thereof are electrically connected to the IC chip mounted on the third wiring member 31. The trace conductors may be configured by directly depositing layers on the surface of the flexure 24 or by adhering a separately formed FPC on the surface of the flexure 24.

The suspension is configured by assembling the load beam 23 and the flexure 24, and the HGA is configured by assembling the suspension, the magnetic head slider 25 and the trace conductors.

Figure 3:
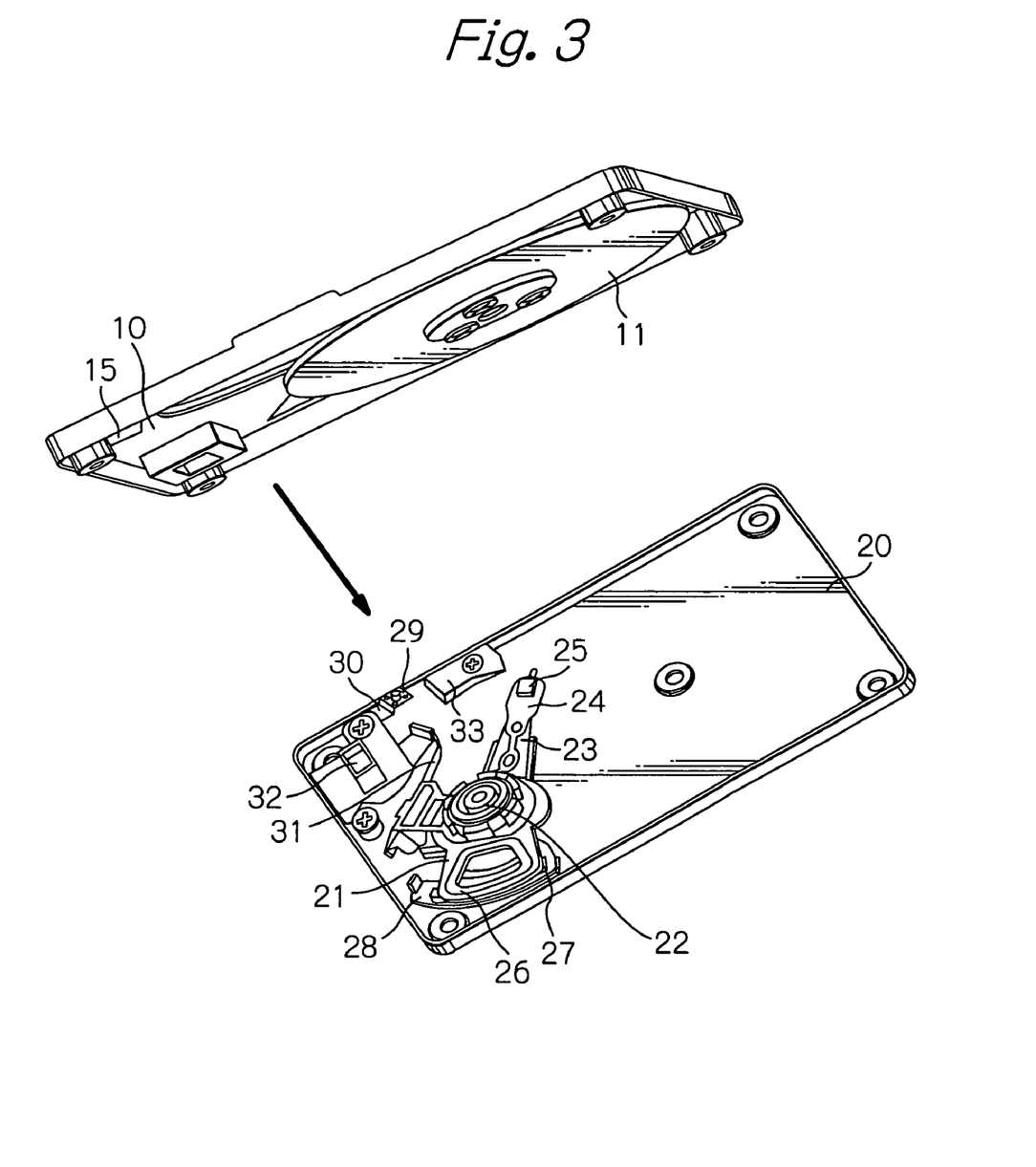
FIG. 3 shows an exploded oblique view illustrating assembling of the HDD apparatus by attaching the cover member to the housing member in the embodiment.

FIG. 3 illustrates assembling of the HDD apparatus by attaching the cover member to the housing member in this embodiment.

As shown in the figure, the magnetic disk 11, the spindle motor, the first wiring member 13 and a part 15 of the yoke section of the VCM are preliminarily attached to the housing member 10, and the horizontal rotation axis 22, the support arm 21, the coil section 26 of the VCM, the magnet section 27 of the VCM, the second wiring member 30, the third wiring member 31, the external connection connector 32 and the ramp 33 are preliminarily attached to the cover member 20. Then, the cover member 20 is fixed to the housing member 10 to cover and seal the opened face of this housing member 10, so as to provide the HDD apparatus.

At this assembling of the housing member 10 and the cover member 20, the first connection section 14 of the housing member 10 and the second connection section 29 of the cover member 20 are brought into pressure contact with each other resulting to make electrical conduction between the first wiring member 13 and the second wiring member 30. Hereinafter, this point will be described in detail.

Figure 4:
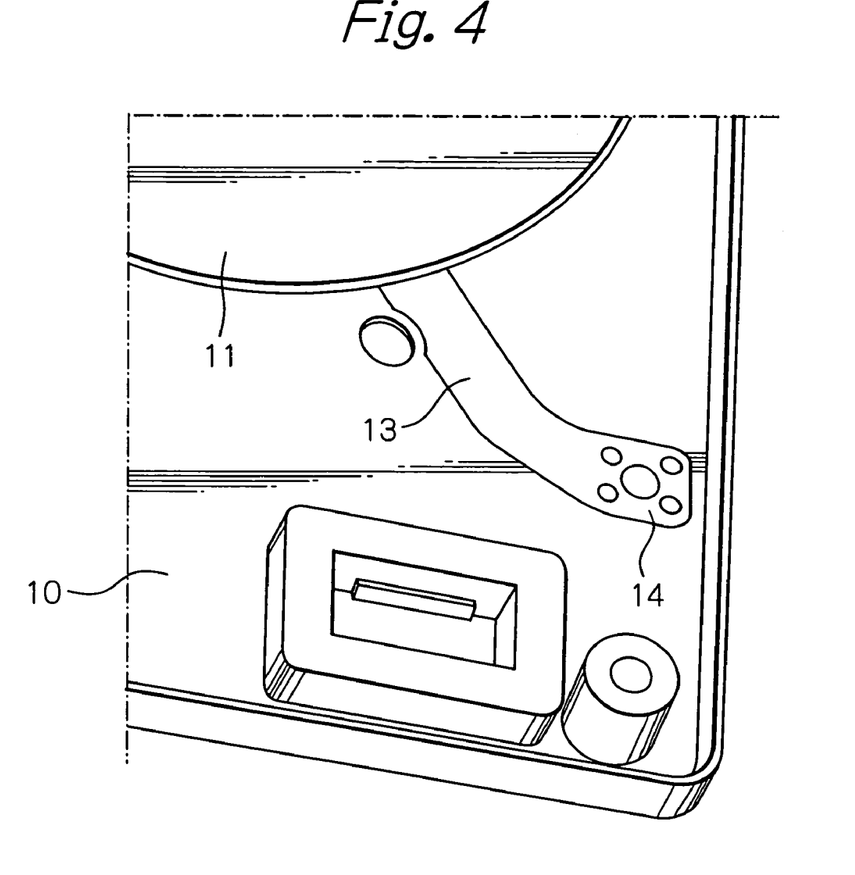
FIG. 4 shows an oblique view illustrating in detail a structure around a first wiring member and a first connection section of the housing member in the embodiment.
Figure 5:
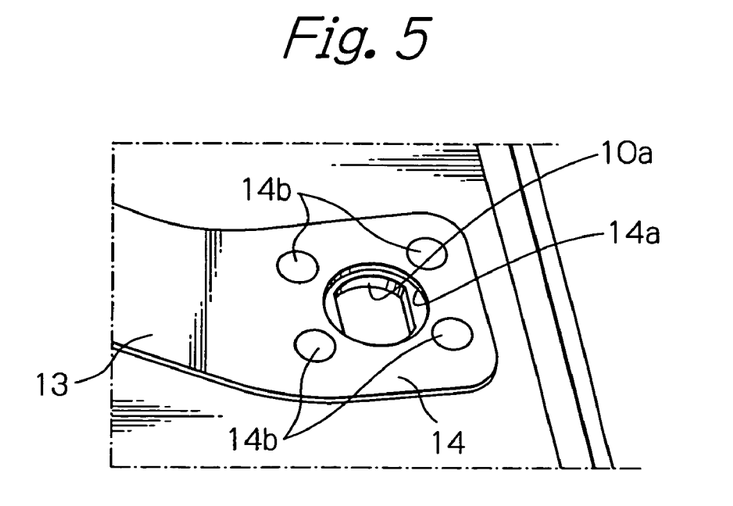
FIG. 5 shows an enlarged oblique view illustrating the first connection section of FIG. 4.
Figure 6:
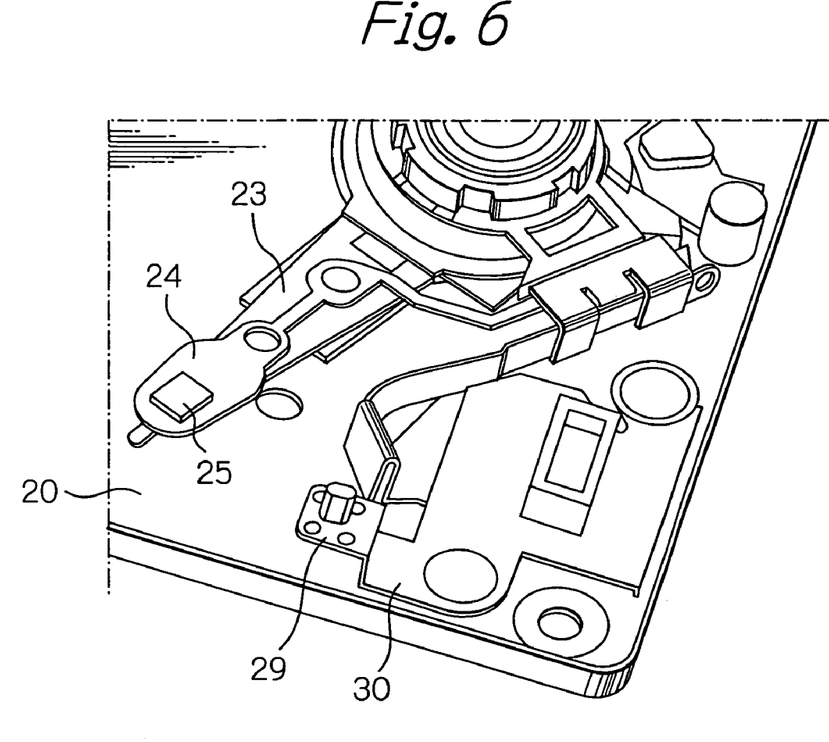
FIG. 6 shows an oblique view illustrating in detail a structure around a second wiring member and a second connection section of the cover member in the embodiment.
Figure 7:
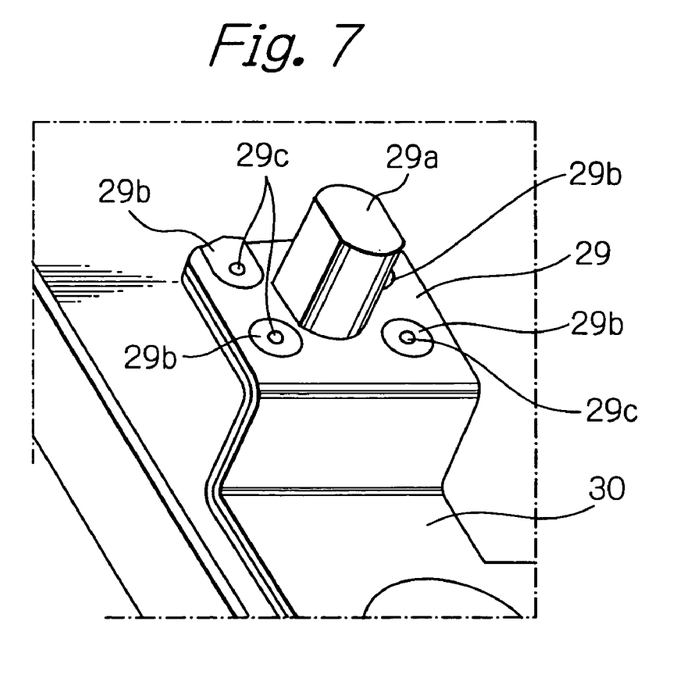
FIG. 7 shows an enlarged oblique view illustrating the second connection section of FIG. 6.
Figure 8:
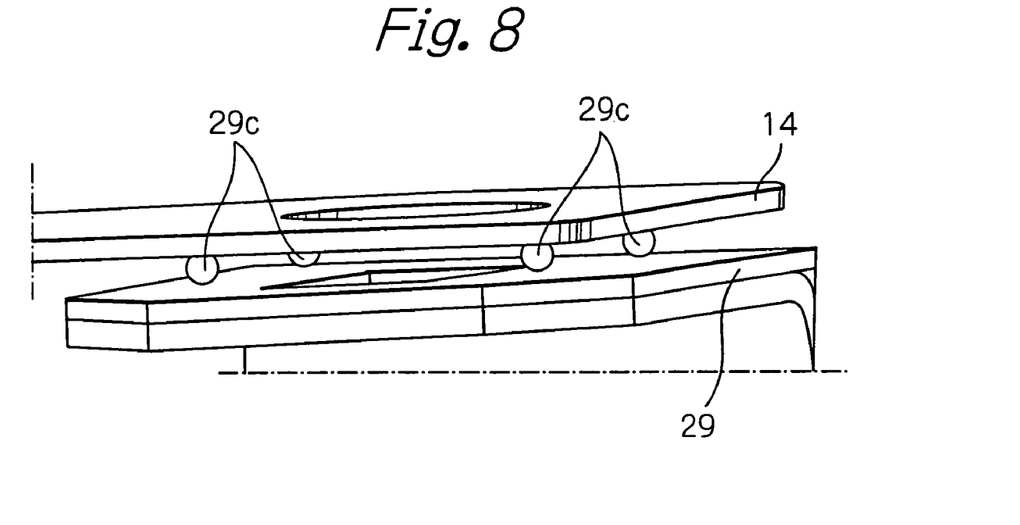
FIG. 8 shows an oblique view illustrating a state where the first and second connection sections are abutted with each other in the embodiment.
Figure 9:
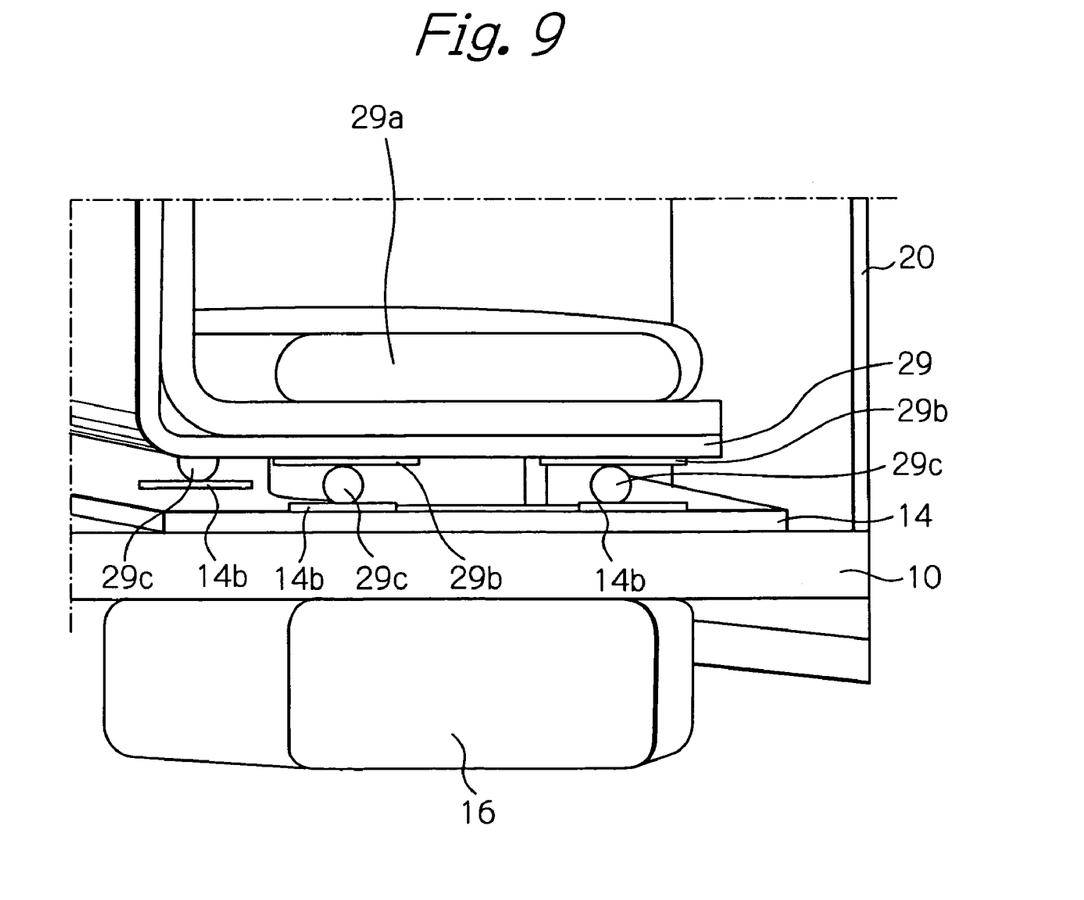
FIG. 9 shows an oblique view illustrating a state where the first and second connection sections are brought into pressure contact with each other by fastening nuts for example in the embodiment.

FIG. 4 illustrates in detail the structure around the first wiring member 13 and the first connection section 14 of the housing member in this embodiment, FIG. 5 illustrates the enlarged first connection section 14 of FIG. 4, FIG. 6 illustrates in detail the structure around the second wiring member 30 and the second connection section 29 of the cover member, FIG. 7 illustrates the enlarged second connection section 29 of FIG. 6, FIG. 8 illustrates a state where the first and second connection sections 14 and 29 are abutted with each other, and FIG. 9 illustrates a state where the first and second connection sections 14 and 29 are brought into pressure contact with each other by fastening nuts for example.

As shown in FIGS. 4 and 5, the first wiring member 13 made of the FPC and the first connection section 14 formed at the other end of the first wiring member 13 are fixed to the housing member 10. In the first connection section 14, a via hole 14a is formed at its center and four connection pads 14b are formed around the via hole 14a. In the housing member 10, a via hole 10a is formed coaxially with the via hole 14a of the first connection section 14.

On the other hand, as shown in FIGS. 6 and 7, the second wiring member 30 made of the FPC and the second connection section 29 formed at the other end of the second wiring member 30 are fixed to the cover member 20. In the second connection section 29, a protruded bolt 29a is formed at its center and four connection pads 29b are formed around the bolt 29a. The bolt 29a has the same axially sectional shape as that of the via hole 10a in the housing member 10.

When the cover member 20 is disposed on the housing member 10 to fix thereto by using a plurality of screws (not shown), the bolt 29a of the cover member 20 is inserted into the via hole 14a and the via hole 10a of the housing member 10, and then a nut 16 is screwed with the bolt 29a as shown in FIG. 9. Thus, gold balls 29c of the second connection section 29 are brought into pressure contact with the respective connection pads 14b of the first connection section 14 to make electrical conductions there between.

Therefore, the electrical connection between the first and second connection sections 14 and 29 can be easily performed by abutting the gold balls 29c of the second connection section 29 to the respective connection pads 14b of the first connection section 14, and by clamping them using the bolt 29a and the nut 16. Also, the electrical disconnection between the first and second connection sections 14 and 29 can be easily performed unscrewing the bolt 29a and the nut 16 to separate them. Namely, when attaching and detaching the cover member 20 to and from the housing member 10, electrical wiring can be easily connected and disconnected.

According to the embodiment, also, the support arm 21 with the HGA having the magnetic head slider 25 and the suspension are attached to the cover member 20, whereas the magnetic disk 11 and the spindle motor are attached to the housing member 10. Therefore, it is possible to assemble the HGA in isolation from the housing member 10 provided with the magnetic disk 11 of which surface has to keep clean, resulting that flexibility of tools or devices used for assembling the HGA can be increased and also assembling itself can be performed with a high degree of efficiency. Furthermore, when replacing the HGA already assembled in the HDD apparatus, the replacement work can be performed by detaching only the cover member 20 from the HDD apparatus, namely by treating only the cover member 20 in isolation from the housing member 10, no contamination of the disk surface can be induced and also the replacement can be effectively executed.

When assembling the HDD apparatus, first, to the housing member 10, a motor assembly consisting of the spindle motor, the magnetic disk 11 and the like, the first wiring member 13, the first connection section 14, the part 15 of the yoke section of the VCM, and other necessary components are preliminarily attached.

On the other hand, to the cover member 20, the HAA consisting of the support arm 21 to which the HGA except for the magnetic head slider 25 is mounted, the horizontal rotation axis 22, the coil section 26 of the VCM and the like, a VCM-yoke assembly consisting of the magnet section 27 of the VCM and the remaining part 28 of the yoke section of the VCM, the second wiring member 30, the second connection section 29, the third wiring member 31, the external connection connector 32, the ramp 33, and other necessary components are preliminarily attached.

Just before the cover member 20 is fixed to the housing member 10 after all the necessary components are attached to this cover member 20, the magnetic head slider 25 is mounted on the flexure 24 of the HGA. The mounting of the magnetic head slider 25 on the flexure 24 is performed by solder ball bonding (SBB). That is, electrical connections of terminal electrodes formed on an element formed surface or trailing surface of the magnetic head slider 25 with connection pads 32 that are a part of the wiring member are performed by SBB using solder balls, and also mechanical fixing of the magnetic head slider 25 to the suspension is performed by SBB using solder balls disposed between the trailing surface 25a and/or a surface different from the trailing surface of the magnetic head slider 25 and the flexure 24.

Because SBB is used for both the electrical connection and the mechanical connection of the slider 25, no clamping tool utilized in the ultrasonic gold ball bonding (GBB) process is necessary to use. Therefore, it is possible to mount the magnetic head slider 25 even after the assembling of the HGA. Also, because the mechanical fixing of the magnetic head slider 25 to the suspension is performed by SBB, the resin-feeding process and the resin-curing process that are necessary when resin adhesive is used for fixing can be omitted resulting the manufacturing process to simplify. Furthermore, if it is necessary to detach the magnetic head slider 25 from the HGA, since the mechanical fixing is executed by SBB, the slider 25 and the flexure 24 can be extremely easily separated from each other by heating the solder balls and by sucking and removing thus molten solder in a vacuum.

Thereafter, the cover member 20 is fixed to the housing member 10 to close the opened face of the housing member 10 to finish the HDD apparatus. At this fixing of the cover member 20 to the housing member 10, the gold balls 29c of the second connection section 29 of the cover member 20 are brought into pressure contact with the respective connection pads 14b of the first connection section 14 of the housing member 10 so as to make electrical conductions there between.

Therefore, the electrical connection between the first and second connection sections 14 and 29 can be easily performed by abutting the gold balls 29c of the second connection section 29 to the respective connection pads 14b of the first connection section 14, and by clamping them using the bolt 29a and the nut 16.

As aforementioned, an HGA with no magnetic head slider that is easily destructed by ESD is first attached to the cover member 20, and then the magnetic head slider 25 is mounted on this HGA just before the cover member 20 is fixed to the housing member 10. Therefore, according to this embodiment, ESD destruction of the magnetic head slider 25 can be effectively suppressed.

In the above-mentioned embodiment, the electrical conduction is obtained by bringing the gold balls of the second connection section of the cover member into pressure contact with the connection pads of the first connection section of the housing member. However, in modifications, gold balls may be fixed on the first connection section of the housing member and these gold balls will be brought into pressure contact with connection pads of the second connection section of the cover member to make electrical conduction there between. Also, instead of the gold balls, any conductive material balls may be used. Furthermore, instead of such balls, conductive projections formed on the connection pads may be used to bring the conductive projections into pressure contact with connection pads of the other connection section to make electrical conduction there between. The conductive projections may be metal projections or gold-coated metal projections.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A magnetic disk drive apparatus comprising:
   a housing member with at least one opened face;
   a cover member for covering said at least one opened face of said housing member;
   a head gimbal assembly including a magnetic head slider and a suspension for supporting said magnetic head slider;
   a support arm for supporting said head gimbal assembly;
   a magnetic disk to which said magnetic head slider opposed;
   a motor for rotating said magnetic disk;
   a first wiring member with one end electrically connected to said motor and the other end electrically connected to a first connection section, said first connection section including an aperture formed there through and a plurality of connection surfaces surrounding the aperture; and
   a second wiring member with one end electrically connected to a second connection section and the other end electrically connected to an external connection connector, the second connection section including a projection configured to extend through the aperture and secure the housing member to the cover member,
   wherein said magnetic disk, said motor, said first connection section and said first wiring member are attached to said housing member, said support arm, said second connection section and said second wiring member are fixed to said cover member, and said first connection section and said second connection section are configured to be electrically conducted by pressure contact.

2. The apparatus as claimed in claim 1, wherein said first connection section and said second connection section are electrically conducted with each other by pressure contact using conductive material projections.

3. The apparatus as claimed in claim 2, wherein said conductive material projections are formed on said first connection section and/or said second connection section.

4. The apparatus as claimed in claim 2, wherein said conductive material projections are gold-coated metal projections.

5. The apparatus as claimed in claim 1, wherein said first connection section and said second connection section are electrically conducted with each other by pressure contact using conductive material balls.

6. The apparatus as claimed in claim 5, wherein said conductive material balls are formed on said first connection section and/or said second connection section.

7. The apparatus as claimed in claim 5, wherein said conductive material balls are gold balls.

8. The apparatus as claimed in claim 1, wherein said apparatus further comprises an actuator for rotatively moving said support arm in parallel with a surface of said magnetic disk, a part of said actuator being attached to said cover member.

9. The apparatus as claimed in claim 8, wherein the remaining part of said actuator is attached to said housing member.

10. The apparatus as claimed in claim 1, wherein said apparatus further comprises a ramp preliminarily attached to said cover member, on which said support arm sits when the apparatus is out of operation.

* * * * *